United States Patent
Fang et al.

(10) Patent No.: US 11,162,790 B2
(45) Date of Patent: Nov. 2, 2021

(54) MEMS GYROSCOPE START-UP PROCESS AND CIRCUIT

(71) Applicant: STMicroelectronics, Inc., Coppell, TX (US)

(72) Inventors: Deyou Fang, Frisco, TX (US); Chao-Ming Tsai, Southlake, TX (US); Yamu Hu, Allen, TX (US)

(73) Assignee: STMicroelectronics, Inc., Coppell, TX (US)

( * ) Notice: Subject to any disclaimer, the term of this patent is extended or adjusted under 35 U.S.C. 154(b) by 97 days.

(21) Appl. No.: 16/452,813

(22) Filed: Jun. 26, 2019

(65) Prior Publication Data

US 2020/0408523 A1     Dec. 31, 2020

(51) Int. Cl.
| | |
|---|---|
| *G01C 19/5719* | (2012.01) |
| *G01C 19/5607* | (2012.01) |
| *G01C 19/5642* | (2012.01) |
| *G01C 19/56* | (2012.01) |
| *G01C 19/5649* | (2012.01) |

(52) U.S. Cl.
CPC ......... *G01C 19/5719* (2013.01); *G01C 19/56* (2013.01); *G01C 19/5607* (2013.01); *G01C 19/5642* (2013.01); *G01C 19/5649* (2013.01)

(58) Field of Classification Search
CPC ................ G01C 19/5719; G01C 19/56; G01C 19/5607; G01C 19/5649; G01C 19/5642
USPC ...................................... 73/504.12
See application file for complete search history.

(56) References Cited

U.S. PATENT DOCUMENTS

| | | | | |
|---|---|---|---|---|
| 5,351,519 | A * | 10/1994 | Kress ....................... | G01D 5/24 324/601 |
| 6,029,516 | A * | 2/2000 | Mori ................... | G01C 19/5642 310/316.01 |
| 6,427,518 | B1 * | 8/2002 | Miekley ............. | G01C 19/5691 73/1.37 |

(Continued)

OTHER PUBLICATIONS

Feng Bu et al., MEMS Gyroscope Automatic Real-Time Mode-Matching Method Based on Phase-Shifted 45° Additional Force Demodulation, MDPI, Sep. 7, 2018, 16 pages (Year: 2018).*

(Continued)

*Primary Examiner* — Clayton E. LaBalle
*Assistant Examiner* — Kevin C Butler
(74) *Attorney, Agent, or Firm* — Crowe & Dunlevy

(57) ABSTRACT

A drive signal is applied to a MEMS gyroscope having several intrinsic resonant modes. Frequency and amplitude of mechanical oscillation in response to the drive signal is sensed. At startup, the drive signal frequency is set to a kicking frequency offset from a resonant frequency corresponding to a desired one of the intrinsic resonant modes. In response to sufficient sensed amplitude of mechanical oscillation at the kicking frequency, a frequency tracking process is engaged to control the frequency for the drive signal to sustain mechanical oscillation at the frequency of the desired one of the plurality of intrinsic resonant modes as the oscillation amplitude increases. When the increasing amplitude of the mechanical oscillation exceeds a threshold, a gain control process is used to exercise gain control over the applied drive signal so as to cause the amplitude of mechanical oscillation to match a further threshold. At that point start-up terminates.

43 Claims, 3 Drawing Sheets

(56) References Cited

U.S. PATENT DOCUMENTS

| | | | |
|---|---|---|---|
| 6,564,637 B1* | 5/2003 | Schalk | G01C 19/5614 73/504.12 |
| 7,155,979 B2* | 1/2007 | Lasalandra | G02B 26/0841 324/661 |
| 8,476,970 B2* | 7/2013 | Mokhtar | G01C 19/5776 327/554 |
| 9,714,842 B2* | 7/2017 | Anac | G01C 19/5712 |
| 9,846,037 B2* | 12/2017 | Aaltonen | G01C 19/5726 |
| 10,760,910 B2* | 9/2020 | Gando | G01C 19/5755 |
| 2005/0016273 A1 | 1/2005 | Murata et al. | |
| 2005/0264366 A1 | 12/2005 | Zivanovic et al. | |
| 2005/0268716 A1* | 12/2005 | Hrovat | G01C 19/5719 73/504.12 |
| 2006/0280202 A1* | 12/2006 | Kelly | H04L 41/08 370/464 |
| 2007/0084270 A1* | 4/2007 | Jarrett | G01M 3/3281 73/49.2 |
| 2007/0169551 A1* | 7/2007 | Kelly | G01P 15/08 73/514.01 |
| 2008/0190199 A1* | 8/2008 | Prandi | G01C 23/005 73/504.12 |
| 2010/0307243 A1* | 12/2010 | Prandi | G01C 19/56 73/504.12 |
| 2011/0146402 A1* | 6/2011 | Donadel | G01C 19/56 73/504.12 |
| 2011/0146403 A1* | 6/2011 | Rizzo Piazza Roncoroni | H03B 5/30 73/504.12 |
| 2011/0197674 A1 | 8/2011 | Prandi et al. | |
| 2011/0254599 A1* | 10/2011 | Dikshit | H03L 7/02 327/156 |
| 2012/0312095 A1* | 12/2012 | Hanson | G01C 19/00 73/504.12 |
| 2013/0268227 A1* | 10/2013 | Opris | G01C 19/5726 702/104 |
| 2013/0271228 A1* | 10/2013 | Tao | G01C 19/5656 331/18 |
| 2013/0283908 A1* | 10/2013 | Geen | G01C 19/5719 73/504.12 |
| 2014/0190258 A1* | 7/2014 | Donadel | G01C 19/5776 73/504.12 |
| 2014/0250970 A1* | 9/2014 | Fang | G01C 25/005 73/1.37 |
| 2014/0250971 A1* | 9/2014 | Fang | G01P 15/125 73/1.37 |
| 2015/0033821 A1* | 2/2015 | Mangano | G01C 25/005 73/1.77 |
| 2015/0177775 A1 | 6/2015 | Beaulation et al. | |
| 2015/0185011 A1* | 7/2015 | Beaulaton | G01C 19/5712 73/504.12 |
| 2015/0226556 A1* | 8/2015 | Aaltonen | G01C 19/5712 73/504.12 |
| 2015/0280949 A1* | 10/2015 | Cornibert | H04L 27/125 340/1.1 |
| 2016/0010994 A1* | 1/2016 | Ackerman | G01C 19/5776 73/504.12 |
| 2016/0103174 A1 | 4/2016 | Aaltonen et al. | |
| 2016/0349056 A1* | 12/2016 | Thompson | B81B 3/0018 |
| 2017/0168088 A1* | 6/2017 | Coronato | G01P 15/125 |
| 2017/0227569 A1* | 8/2017 | Alwardi | G01R 27/2605 |
| 2017/0328712 A1* | 11/2017 | Collin | H03D 7/00 |
| 2018/0038692 A1* | 2/2018 | Prati | G01C 19/5776 |
| 2018/0335446 A1* | 11/2018 | Choi | G01R 31/2829 |
| 2019/0025056 A1* | 1/2019 | Hughes | G01P 21/00 |
| 2019/0145773 A1* | 5/2019 | Collin | G01C 19/5776 73/504.12 |
| 2020/0278205 A1 | 9/2020 | Kraver | |
| 2020/0400433 A1 | 12/2020 | Aaltonen et al. | |
| 2020/0408523 A1* | 12/2020 | Fang | G01C 19/5719 |
| 2020/0408524 A1* | 12/2020 | Hu | H04L 27/364 |

OTHER PUBLICATIONS

Shadi Khazaaleh et al., Vulnerability of MEMS Gyroscopes to Targeted Acoustic Attacks, IEEE Access, Jul. 5, 2019, 10 pages (Year: 2019).*

Ganesh K. Balachandran et al.: "A 3-Axis Gyroscope for Electronic Stability Control With Continuous Self-Test," IEEE Journal of Solid State Circuits, 2016, pp. 1-10.

Maeda, Daisuke, et al: MEMS Gyroscope With Less Than 1-deg/h Bias Instability Variation in Temperature Range From -40° C. to 125° C., IEEE Sensors Journal, vol. 18, No. 3, Feb. 1, 2018, pp. 1006-1015.

Shaeffer, Derek K.: "MEMS Inertial Sensors: A Tutorial Overview," IEEE Communications Magazine, Apr. 2013, pp. 100-109.

Sun, X, et al: "Stability and Resolution Analysis of a Phase-Locked Loop Natural Frequency Tracking System for MEMS Fatigue Testing," Journal of Dynamic Systems, Measurement, and Control, Dec. 2002, vol. 124, pp. 599-605.

* cited by examiner

MEMS GYROSCOPE START-UP PROCESS AND CIRCUIT

TECHNICAL FIELD

The present invention generally relates to a microelectromechanical system (MEMS) sensor of a gyroscope type and, in particular, to a start-up process for ensuring oscillation of the driving mass in a desired resonant mode.

BACKGROUND

A capacitive microelectromechanical system (MEMS) gyroscope sensor is a complex electromechanical structure that includes two masses that are moveable with respect to a stator body and are coupled to one another so as to have a relative degree of freedom. The two mobile masses are both capacitively coupled to the stator body. A first one of the mobile masses (referred to as the driving mass) is dedicated to driving and is kept in oscillation at a resonance frequency. The second one of the mobile masses (referred to as the sensing mass) is drawn along in oscillating motion due to the coupling to the driving mass. In the case of a rotation of the structure with respect to a predetermined gyroscope axis with an angular velocity, the sensing mass is subjected to a Coriolis force proportional to the angular velocity itself. A change in capacitance with respect to the sensing mass is sensed in order to detect the angular motion (rotation).

Because the MEMS gyroscope is a coupled spring-mass-damper system, it intrinsically possesses a plurality of resonant modes. This is shown by FIG. 1 which illustrates a graph of driving mass amplitude response as a function of frequency for an example MEMS gyroscope, where each peak 2 is indicative of an intrinsic resonant mode at a corresponding intrinsic resonant frequency. Start-up of the MEMS gyroscope needs to be carefully controlled in order to ensure that the driving mass is oscillating in normal functional mode at or near the resonant frequency of the desired resonant mode (for example, reference 2a) of the plurality of intrinsic resonant modes. The desired resonant mode may, for example, be the anti-phase drive mode which is desired to minimize rate output error due to common-mode trans-linear motion of the sensing mass.

Another concern with MEMS gyroscope operation is that the oscillation frequency has a dependency on oscillation amplitude. At higher excitation levels of the driving mass, the peak frequency shifts and the functional relationship between amplitude and frequency is no longer a single-valued function. This is referred to in the art as the duffing effect and is illustrated in the graph of FIG. 2 which plots oscillation frequency response for a plurality of oscillation amplitudes. For oscillation amplitudes 4a-4c, for example, there exists a single-valued functional relationship between amplitude and frequency (noting that the peak frequency shifts lower than the resonant frequency 8 for increasing oscillation amplitudes). However, for drive amplitude 4d the response exhibits a frequency hysteresis and unstable operation where the oscillation can have a value at and/or between two different frequencies 6a, 6b that are offset from the resonant frequency 8. The amplitude of oscillation must be controlled during start-up of the MEMS gyroscope in order to ensure that the unstable operation region 8a where oscillation frequency hysteresis is present is avoided.

There is accordingly a need in the art for a technique for controlling start-up of a MEMS gyroscope sensor.

SUMMARY

In an embodiment, a method is provided for start-up of a microelectromechanical system (MEMS) gyroscope having a plurality of intrinsic resonant modes. Operation of the MEMS gyroscope includes applying a drive signal to the MEMS gyroscope; and sensing frequency and amplitude of mechanical oscillation of the MEMS gyroscope in response to the applied drive signal. The process for start-up includes the following steps performed in the recited order: setting a frequency for the applied drive signal to a kicking frequency that is frequency offset from a resonant frequency corresponding to a desired one of the plurality of intrinsic resonant modes; determining that the amplitude of the sensed mechanical oscillation in response to the kicking frequency exceeds a first amplitude threshold; controlling a drive frequency for the applied drive signal using a frequency tracking process so as to sustain mechanical oscillation at the frequency of the desired one of the plurality of intrinsic resonant modes; sensing an increase in the amplitude of the sensed mechanical oscillation that exceeds a second amplitude threshold; and gain controlling the applied drive signal so that the sensed amplitude of the mechanical oscillation matches a third amplitude threshold greater than the second amplitude threshold.

In an embodiment, a method is provided for start-up of a resonant mechanical system having an intrinsic resonant mode. Operation of the resonant mechanical system includes: applying a drive signal which induces oscillation of the resonant mechanical system; and sensing frequency and amplitude of mechanical oscillation in response to the applied drive signal. The process for start-up includes the following steps performed in the recited order: sweeping a frequency for the applied drive signal over a range of kicking frequencies that are near a resonant frequency of said intrinsic resonant mode; identifying one of kicking frequencies of said range as corresponding to the resonant frequency if the amplitude of the sensed mechanical oscillation exceeds a first amplitude threshold; controlling a drive frequency for the applied drive signal using a frequency tracking process so as to sustain mechanical oscillation at the frequency of the desired one of the plurality of intrinsic resonant modes; sensing an increase in the amplitude of the sensed mechanical oscillation that exceeds a second amplitude threshold; and gain controlling the applied drive signal so that the sensed amplitude of the mechanical oscillation matches a third amplitude threshold greater than the second amplitude threshold.

BRIEF DESCRIPTION OF THE DRAWINGS

For a better understanding of the embodiments, reference will now be made by way of example only to the accompanying figures in which.

DETAILED DESCRIPTION

Figure 3:
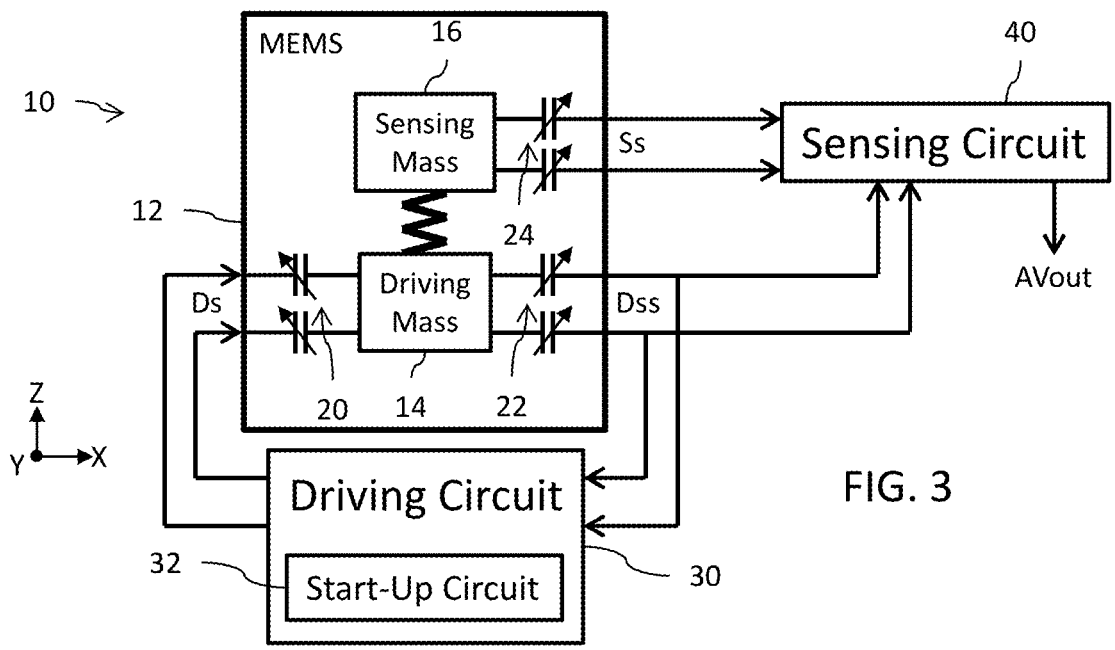
FIG. 3 is a block diagram of a MEMS gyroscope sensor.

FIG. 3 shows a block diagram of a MEMS gyroscope sensor 10. The sensor 10 includes a MEMS microstructure 12 with a stator body, a driving mass 14 and a sensing mass 16. For simplicity, the MEMS microstructure 12 illustrates the case of a uniaxial gyroscope in which only one sensing mass 16 is present, although the configuration and operation is equally applicable to multi-axial gyroscopes with multiple sensing masses. The driving mass 14 is elastically constrained to the stator body so as to be able to oscillate about a rest position according to one degree of freedom shown by the X-axis (also referred to as the driving axis). In this regard, the driving mass and stator body define a resonant mechanical system which exhibits a plurality of intrinsic resonant modes with corresponding intrinsic resonant frequencies. The sensing mass 16 is mechanically coupled to the driving mass 14 so as to be driven in motion according to the same degree of freedom (i.e., in the X-axis). Moreover, the sensing mass 16 is elastically coupled to the driving mass 14 so as to oscillate in turn with respect to the driving mass according to another degree of freedom shown by the Y-axis (also referred to as the sensing axis). When a rotational rate in the Z-axis is applied to the microstructure 12, the induced Coriolis force will cause the sensing mass 16 to oscillate in the Y-axis.

The driving mass 14 and sensing mass 16 are capacitively coupled to the stator body. In particular, the driving mass 14 is capacitively coupled to the stator body through a set of driving capacitors 20 which are connected to drive actuation electrodes and a set of drive sensing capacitors 22 which are connected to drive sense electrodes. The driving capacitors 20 are configured to respond to an applied differential oscillating drive signal Ds by applying an electrostatic force to induce oscillatory movement of the mobile masses in the X-axis. The drive sensing capacitors 22 are configured such that their capacitance depends in a differential way on the position of the driving mass 14 with respect to the stator body relative to the X-axis, and thus signals generated by the sensing capacitors 24 are indicative of movement of the driving mass 14 relative to the X-axis. The sensing mass 16 is capacitively coupled to the stator body through a set of sensing capacitors 24 which are connected to sensing electrodes. The sensing capacitors 24 are configured such that their capacitance depends in a differential way on the position of the sensing mass 16 with respect to the stator body relative to the Y-axis, and thus signals generated by the sensing capacitors 24 are indicative of movement relative to the Y-axis.

An application specific integrated circuit (ASIC) is electrically connected to the MEMS microstructure 12. The ASIC of the sensor 10 includes a driving circuit 30 having an input coupled to the drive sense electrodes for the drive sensing capacitors 22 to receive a differential drive sense signal Dss (which is indicative of driving mass 14 mechanical oscillation amplitude and frequency) and an output coupled to the drive actuation electrodes for the driving capacitors 20 to apply the drive signal Ds (which is used to apply the drive force which induces driving mass oscillation). This coupling in feedback forms an oscillating micro-electro-mechanical loop that is configured to sustain the driving mass 14 in oscillation at or substantially near a desired resonance frequency of the plurality of intrinsic resonance frequencies and with a controlled amplitude. The ASIC of the sensor 10 further includes a sensing circuit 40 having a first input coupled to the drive sense electrodes for the drive sensing capacitors 22 and a second input coupled to the sensing electrodes for the sensing capacitors 24. The sensing circuit 40 receives a differential sense signal Ss generated by the sensing capacitors 24 and indicative of displacement of the sensing mass 16 relative to the Y-axis, demodulates the differential sense signal Ss in response to the differential drive sense signal Dss generated by the drive sensing capacitors 22, and outputs a signal indicative of sensed angular velocity (AVout) as a result of that demodulation.

Because it is not a focus of the present invention, details concerning quadrature error compensation control of the sensing mass 16 are omitted. Quadrature error compensation techniques are well-known to those skilled in the art.

As previously noted, it is important when starting up the MEMS gyroscope sensor 10 to ensure that the driving mass will oscillate at a frequency corresponding to (i.e., near or equal to) the resonant frequency of the desired resonant mode of the plurality of intrinsic resonant modes. The desired resonant mode may, for example, be the anti-phase drive mode. Still further, it is important at start-up to ensure that the amplitude of oscillation is controlled so as to avoid the unstable operation region where the frequency hysteresis exists. The driving circuit 30 of the ASIC accordingly includes a start-up circuit 32 which operates to ensure proper resonant frequency oscillation and amplitude of the driving mass.

Figure 4:
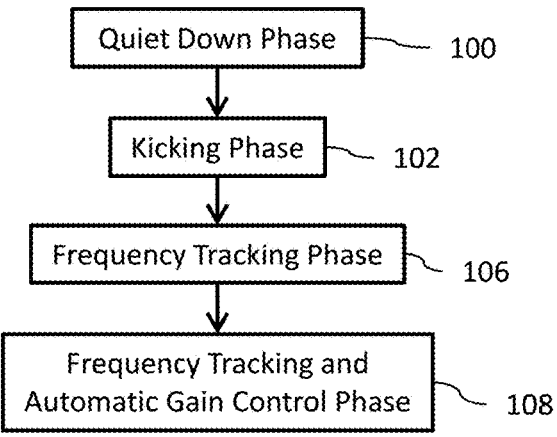
FIG. 4 shows a flow diagram for a start-up process.

Reference is now made to FIG. 4 which shows a flow diagram for a start-up process implemented by the start-up circuit 32.

In a first phase 100 of the start-up process (time T0 to time T1 in FIG. 6), referred to as the quiet down phase, no drive force through the drive signal Ds is applied and a delay is implemented to permit any residual mechanical oscillation of the mobile masses 14 and 16 of the MEMS microstructure 12 to dampen (i.e., to dissipate or quiet down). In this regard, the quieting of the mobile masses 14 and 16 refers to a reduction in the amplitude of oscillation. Through the differential drive sense signal Dss, the start-up circuit 32 of the driving circuit 30 can monitor oscillation of the driving mass and delay further start-up actions until the sensed oscillation amplitude has quieted to at least a desired degree (i.e., the oscillation amplitude is minimal or negligible). The quiet down condition may, for example, be satisfied when the sensed oscillation amplitude of the driving mass 14 is at or below a quiet threshold amplitude.

Figure 1:
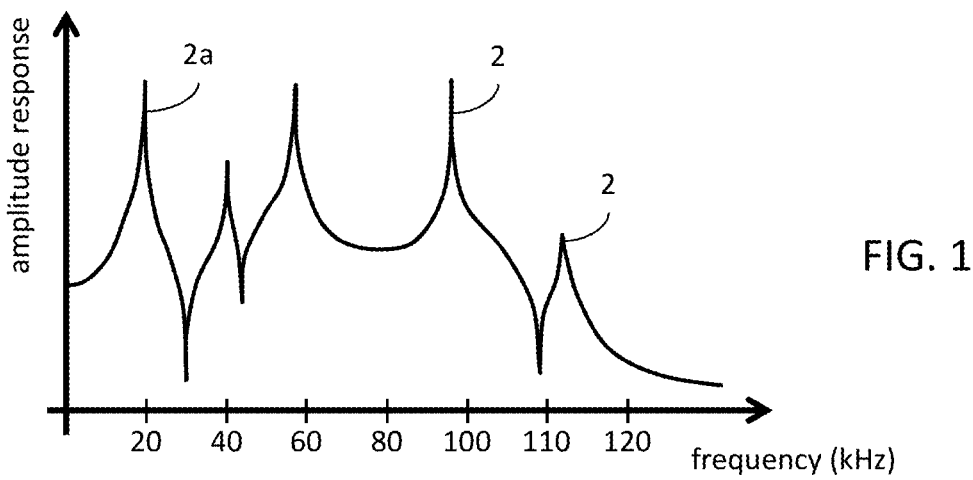
FIG. 1 illustrates a graph of driving mass amplitude response as a function of frequency for an example MEMS gyroscope.
Figure 5:
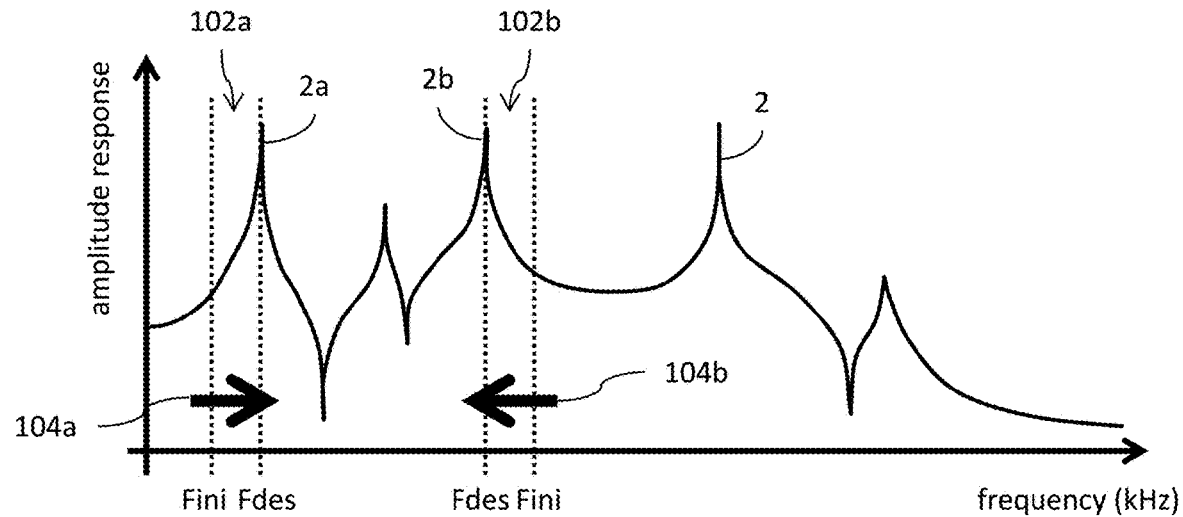
FIG. 5 illustrates operation of the kicking phase of the start-up process.

In a second phase 102 of start-up (time T1 to time T2 in FIG. 6), referred to as the kicking phase, the drive signal Ds is set by the start-up circuit 32 of the driving circuit 30 with a fixed amplitude and with a kicking frequency that is chosen to have an initial frequency (Fini) that is chosen to be close to the a priori unknown actual resonance frequency of the desired resonant mode of the plurality of intrinsic resonant modes for the mechanical oscillation of the driving mass 14 of the MEMS microstructure 12. The kicking frequency of the drive signal Ds is then varied (for example, increased or decreased by a frequency sweeping operation from the initial frequency Fini) by the start-up circuit 32 of the driving circuit 30 to approach the frequency of the desired resonant mode. This operation is shown in FIG. 5 which references the graph of driving mass amplitude response as a function of frequency as shown in FIG. 1. For the desired resonant mode (reference 2a) of the plurality of intrinsic resonant modes (reference 2) of the MEMS microstructure 12, the initial frequency Fini for the drive signal Ds is selected with a frequency offset 102a below (i.e., lower than) the resonance frequency Fdes associated with the desired resonant mode. The variation in the kicking frequency of the drive signal Ds is accordingly an increase by frequency stepping or frequency sweeping as indicated by the arrow 104a from the initial frequency Fini towards the frequency Fdes. FIG. 5 further shows for a different desired resonant mode (reference 2b) the selection of the initial frequency Fini for the drive signal Ds with a frequency offset 102b above (i.e., higher than) the frequency Fdes associated with the desired resonant mode, along with a decreasing variation by frequency stepping or frequency sweeping in the kicking frequency as indicated by the arrow 104b. The amplitude of the mechanical oscillation of the driving mass 14 due to the applied drive signal Ds at the selected kicking frequency is monitored by the start-up circuit 32 of the driving circuit 30 and the second phase 102 of start-up terminates when the sensed amplitude of the mechanical oscillation in response to the selected kicking frequency for the applied drive signal Ds is larger than a preset amplitude threshold. In this regard, it will be noted that the closer the chosen kicking frequency is to the frequency Fdes associated with the desired resonant mode, the larger the sensed amplitude of the mechanical oscillation.

In a third phase 106 of start-up (time T2 to time T3 in FIG. 6), referred to as the frequency tracking phase, the drive signal Ds is set with a fixed amplitude and the frequency of the drive signal Ds is controlled to match the measured oscillation frequency (which corresponds, for example, to the oscillation frequency at the end of the second phase) and thus sustain mechanical oscillation at or substantially equal to a frequency of the desired one of the plurality of intrinsic resonant modes. The phase of the drive signal Ds is controlled by the driving circuit 30, normally with a 90° phase shift relative to the measured phase of mechanical oscillation, so as to drive the driving mass 14 with a positive mechanical-electrical feedback loop. This positive feedback loop will sustain a mechanical oscillation that has a sensed oscillation frequency that is at or near the frequency Fdes associated with the desired resonant mode, and the displacement amplitude of the driving mass 14 will increase in an exponential manner due to the positive feedback. The start-up circuit 32 of the driving circuit 30 monitors oscillation of the driving mass to sense amplitude of the mechanical oscillation of the driving mass 14 and the third phase 106 of start-up terminates when exponentially increasing sensed oscillation amplitude reaches a threshold amplitude B.

Figure 2:
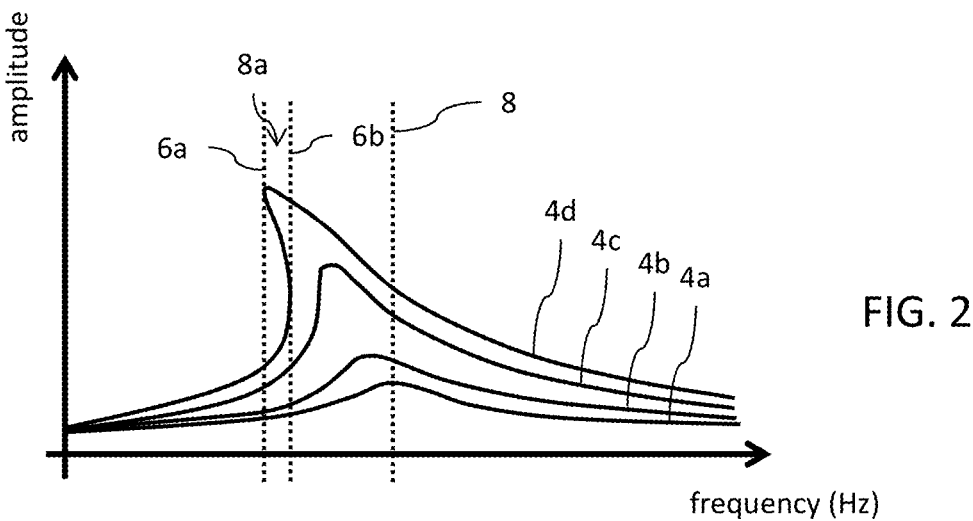
FIG. 2 plots oscillation frequency response for a plurality of drive amplitudes.

In a fourth phase 108 of start-up (starting at time T3 of FIG. 6), referred to as the frequency tracking and automatic gain control phase, the frequency tracking operation of the third phase is maintained (i.e., the frequency of the drive signal Ds is kept the same as the measured frequency, and the phase of the drive signal Ds is controlled by the circuitry 30 to sustain the oscillation at or near to the frequency Fdes). The driving force, in a differential driving mode, is proportional to the product of the DC voltage of drive signal Ds and the sinusoidal (AC) amplitude of the drive signal Ds. In this fourth phase, either the DC voltage of drive signal Ds, or the AC amplitude of drive signal Ds, is gain controlled by a negative feedback to cause the displacement amplitude of the mechanically oscillating driving mass 14 to settle to a desired amplitude A; where, notably and importantly, the amplitude is not within the unstable operation region where hysteresis in resonance frequency exists (see, region 8a of FIG. 2). This amplitude control procedure is widely known as Automatic Gain Control (AGC) to those skilled in the art. The start-up circuit 32 of the driving circuit 30 monitors the mechanical oscillation of the driving mass 14 to sense the oscillation amplitude, frequency and phase; and these sensed characteristics are used by the frequency tracking and AGC circuitry to sustain a mechanical oscillation at the measured frequency (that is at or equal to the frequency Fdes) and drive the amplitude of the oscillation to meet the desired amplitude A. Once the sensed oscillation amplitude reaches the desired constant amplitude A, proper gyroscope drive oscillation is fully established and the start-up process ends. Frequency tracking and AGC will continue to work thereafter for the whole operation time of gyroscope during the normal functional operating mode in which angular rate measurements are made.

Figure 6:
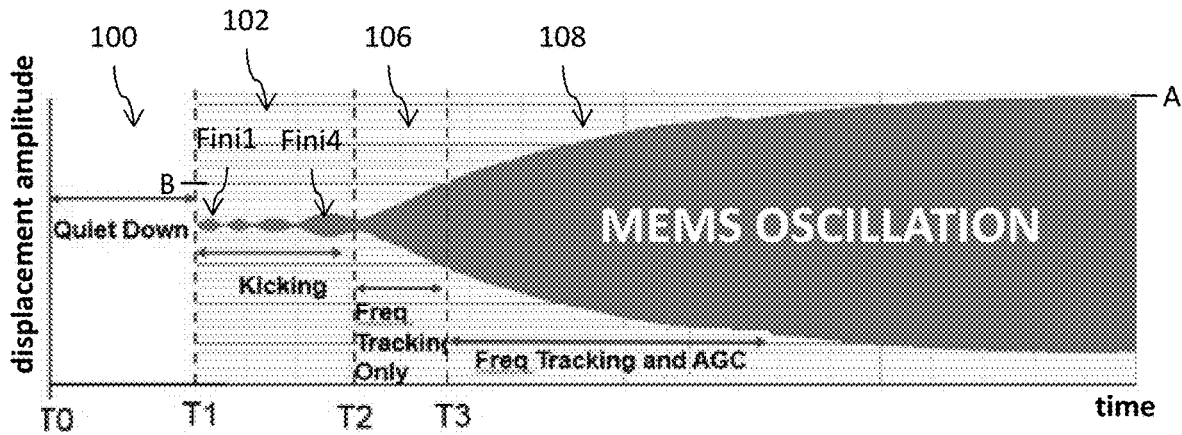
FIG. 6 graphically illustrates the start-up process from the perspective of MEMS oscillation over time.

FIG. 6 graphically illustrates the start-up process implemented by the start-up circuit 32 from the perspective of MEMS oscillation over time. In the first phase 100 of the start-up process (time T0 to time T1), residual mechanical oscillation of the MEMS microstructure 12 is quieted to a condition of a minimal or negligible oscillation amplitude that is at or below the quiet threshold amplitude.

In the second phase 102 of start-up (time T1 to time T2), the drive signal Ds having the fixed amplitude and variable (for example, swept) kicking frequency (Fini1, . . . , Fini4, for example) is applied to the MEMS microstructure 12. The amplitude of the mechanical oscillation of the driving mass 14 in response to the applied drive signal DS at the chosen kicking frequency is monitored in comparison to a preset amplitude threshold. In this regard it will be understood that the chosen kicking frequency and the desired MEMS resonant frequency Fdes are not exactly the same. As a result, there is a frequency difference Δfreq (that is small but not zero, for instance, within +/− a few tens of Hertz) between the two frequencies, and the amplitude of the mechanical oscillation will vary at a frequency which corresponds to the frequency difference Δfreq as is shown by the varying amplitude oscillation pulses that are shown in FIG. 6. The second phase 102 terminates when the sensed amplitude of the mechanical oscillation is larger than a preset amplitude threshold (this being indicative that the chosen kicking frequency is near or equal to the frequency Fdes).

In the third phase 106 of start-up (time T2 to time T3), the drive signal Ds having the fixed amplitude and a frequency and phase that are controlled by a frequency tracking loop in order to drive the mechanical oscillation of the MEMS microstructure 12 at a frequency that is substantially equal to the frequency Fdes of the desired resonant mode (this is also known in the art as self-oscillation). It will be noted that the displacement amplitude of the mechanical oscillation of the MEMS microstructure 12 will increase (for example, in an exponential manner) during frequency tracking if the measured frequency Fd_m is equal to or near the frequency Fdes. The third phase 106 terminates when sensed oscillation amplitude reaches a threshold amplitude B.

In the fourth phase 108 of start-up (starting at time T3), the drive signal Ds is applied to the MEMS microstructure 12, and the drive signal has: a) a frequency and phase that are controlled by a frequency tracking loop in order to drive the mechanical oscillation of the MEMS microstructure 12 at a frequency that is substantially equal to the frequency Fdes of the desired resonant mode; and b) a variable amplitude controlled by gain control negative feedback so that the mechanical oscillation of the MEMS microstructure 12 has a displacement amplitude that matches a desired amplitude A. Once the displacement amplitude of the mechanical oscillation increases to achieve the desired amplitude A, the start-up process terminates. After this point in time, the frequency tracking and AGC function together to maintain the mechanical oscillation at the frequency Fdes with a constant amplitude A during the normal functional operation mode of the gyroscope.

The start-up process described herein presents a number of advantages including: a) ensuring that the MEMS starts from a quieted condition in order to avoid an unknown motion which could adversely affect achieving oscillation at or near the desired resonant mode; b) ensuring that the MEMS oscillates at a drive mode corresponding to the desired resonant mode by eliminating the risk of locking to an unwanted parasitic mode; c) allowing for flexible start-up time control (for example, the drive force in kicking phase and frequency tracking phase can be flexibly controlled, or be digitally programmable); d) minimizing the length of the start-up time period; and e) the start-up circuit 32 of the driving circuit 30 does not require use of a phase lock loop (PLL).

Figure 7:
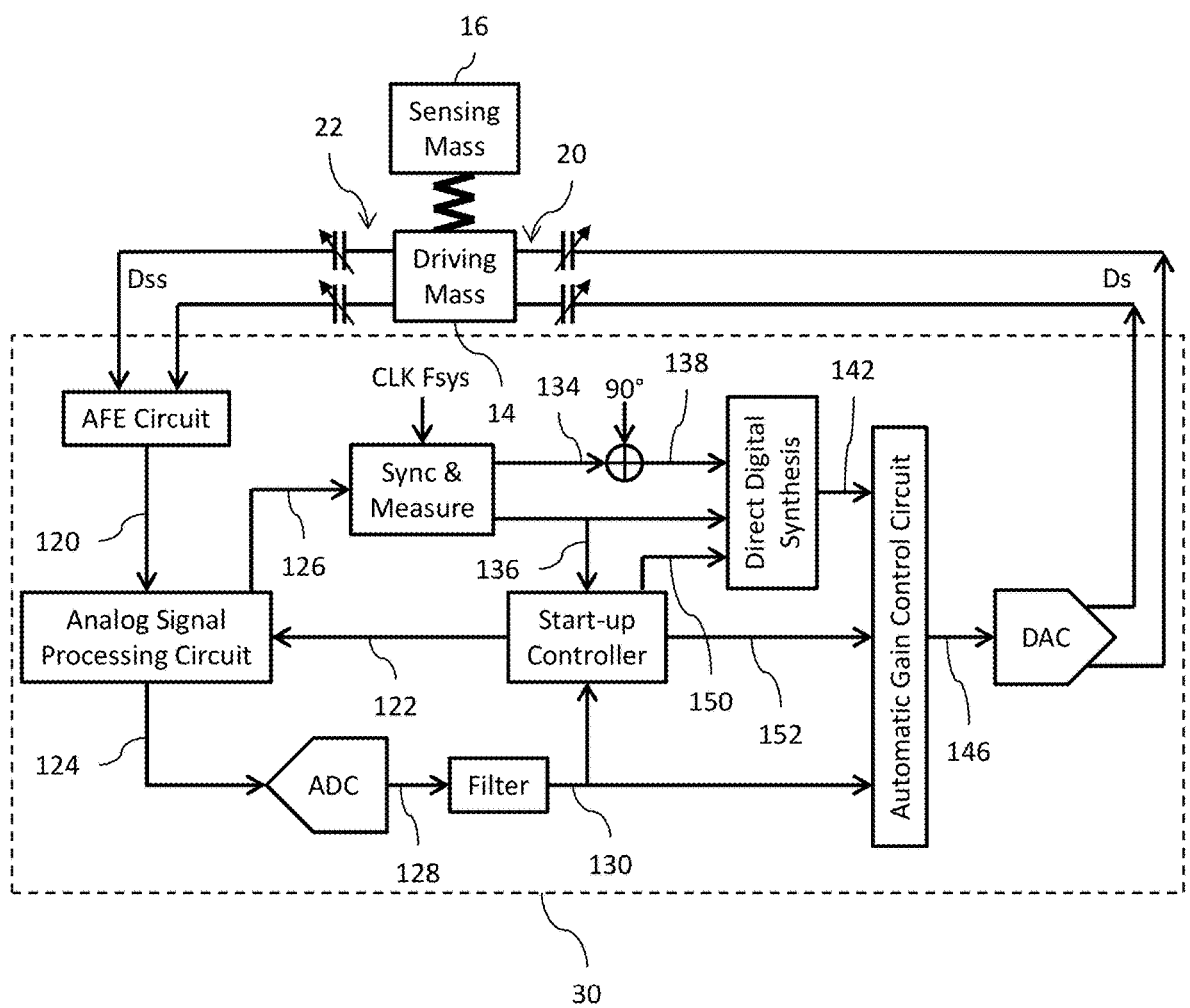
FIG. 7 shows a block diagram of a driving circuit which includes start-up functionality.

Reference is now made to FIG. 7 which shows a block diagram of the driving circuit 30 which includes the start-up circuit 32 functionality. It will be understood that this is just one example of circuitry for the driving circuit 30 which can implement the start-up process of FIG. 4. The driving circuit 30 includes an analog front end (AFE) circuit having inputs coupled to the drive sensing capacitors 22 to receive the differential drive sense signal Dss (which is indicative of driving mass oscillation amplitude, frequency and phase). The AFE circuit generates an analog sinusoid signal 120 ($\sin(2\pi*Fd)$) which oscillates at the frequency Fd of the mechanical oscillation of the driving mass 14 of the MEMS microstructure 12. The AFE circuit may comprise, for example, a charge to voltage (C2V) converter circuit that operates to convert the sensed differential charge on the drive sensing capacitors 22 to output a corresponding analog voltage signal.

The analog sinusoid signal 120 is input to an analog signal processing circuit which also receives a demodulation clock signal 122 (CLK Fdmod). The analog signal processing circuit first converts the analog sinusoid signal 120 into a clock signal 126 (CLK Fd) having a frequency Fd corresponding to the frequency of the mechanical oscillation of the driving mass 14. The analog processing circuit further demodulates the analog sinusoid signal 120 using the demodulation clock signal 122 to output an analog amplitude signal 124 (Amp_a) having a voltage corresponding to the amplitude of the mechanical oscillation.

The analog amplitude signal 124 is converted by an analog-to-digital converter (ADC) circuit to generate a digital amplitude signal 128 (Amp_d) that is digitally filtered to output an oscillation amplitude signal 130 (Amp) specifying the measured amplitude of the mechanical oscillation of the driving mass 14 produced in response to the applied driving signal Ds.

A synchronization and measurement circuit receives the clock signal 126 and synchronizes the phase of the clock signal 126 to a system clock signal (CLK Fsys) at a frequency Fsys which may be substantially greater than the frequency Fd (for example, Fsys may be on the order of 1000*Fd). Phase and frequency measurements are made on the synchronized clock signal 126 to generate a measured phase signal 134 ($\phi d\_m$) corresponding to the measured phase of the mechanical oscillation of the driving mass 14 and generate a measured frequency signal 136 (Fd_m) corresponding to the measured frequency of the mechanical oscillation of the driving mass 14. A phase shifting circuit shifts the measured phase signal 134 by 90 to generate a quadrature phase shifted signal 138 ($\phi d\_m+90°$).

The measurement frequency signal 136 and the quadrature phase shifted signal 138 are input to a direct digital synthesis (DDS) circuit which operates as a frequency synthesizer to generate a digital sinusoid signal 142 ($\cos(2\pi*Fdr)$ at a drive frequency Fdr based on the measured frequency (Fd_m) and the quadrature phase ($\phi d\_m+90°$). Driving with the quadrature phase relationship is a requirement in order to produce oscillation of the driving mass 14.

An automatic gain control (AGC) circuit receives the digital sinusoid signal 142 and the detected amplitude signal 130. The digital sinusoid signal 146 has either its DC voltage level or its AC amplitude controlled by AGC, so has to generate a signal for applying a controlled drive force, normally proportional to DC*Amp, that will regulate the detected amplitude 130 to settle to a preset amplitude (i.e., the amplitude A as noted above).

The gain controlled digital sinusoid signal 146 is converted by a digital-to-analog converter (DAC) circuit to generate the differential oscillating drive signal Ds which is applied to the driving capacitors 20 for the driving mass 14 of the MEMS microstructure 12.

A start-up controller circuit supplies the demodulation clock signal 122 to the analog signal processing circuit. The start-up controller circuit further receives the oscillation amplitude signal 130 providing information concerning the detected amplitude Amp of the mechanical oscillation of the MEMS microstructure 12 and the measurement frequency signal 136 providing information concerning the detected frequency of the mechanical oscillation of the MEMS microstructure 12. The start-up controller circuit further generates a frequency control signal 150 that is applied to the DDS circuit for specifying the kicking frequency and a mode control signal 152 for controlling (for example, enabling) the operation of the AGC circuit to adjust one or both of the DC voltage level or AC amplitude of the digital sinusoid signal 146.

Operation of the circuitry of the driving circuit 30 to implement the start-up process provided by the start-up circuit 32 is as follows:

In the first phase 100 of the start-up process (quiet down), the mode control signal 152 output by the start-up controller circuit controls the driving circuit 30, more specifically the AGC circuit, to control the generation of the digital sinusoid signal 146 so that there is no drive force being applied to the driving mass 14. In the absence of the drive force, any residual mechanical oscillation of the mobile masses 14 and 16 of the MEMS microstructure 12 is dampened. The start-up controller circuit can monitor the oscillation amplitude signal 130 (providing information concerning the detected amplitude Amp of the mechanical oscillation) to confirm that movement of the driving mass 14 has quieted. This state is confirmed by the start-up controller circuit, for example, if the sensed oscillation amplitude of the driving mass as provided by the oscillation amplitude signal 130 is at or below a quiet threshold amplitude.

In the second phase 102 of start-up (kicking phase), the frequency control signal 150 output by the start-up controller circuit controls the DDS circuit to generate the digital sinusoid signal 142 at a specified kicking frequency (i.e., the drive frequency Fdr is set equal to the chosen kicking frequency). The mode control signal 152 output by the start-up controller circuit controls the AGC circuit to apply a fixed AC amplitude and DC offset to the digital sinusoid signal 146. The resulting gain controlled digital sinusoid signal 146 is converted by the digital-to-analog converter (DAC) circuit to generate the differential oscillating drive signal Ds for application to the driving capacitors 20 in generating the applied driving force. In response, the driving mass 14 will oscillate.

The frequency control signal 150 specified kicking frequency has an initial frequency Fini that is chosen to be close to the a priori unknown actual frequency Fdes of the desired resonant mode of the plurality of intrinsic resonant modes for the mechanical oscillation of the driving mass 14 of the MEMS microstructure 12. Over the course of the second phase 102, the frequency control signal 150 output by the start-up controller circuit causes the selected kicking frequency to vary (for example, increase or decrease by a frequency sweeping operation), so as to approach the frequency Fdes of the desired resonant mode. The start-up controller circuit applies the demodulation clock signal 122 with a frequency Fdmod equal to the chosen kicking frequency. When the swept value for the selected kicking frequency is close to the frequency Fdes of the desired resonant mode, the mechanical oscillation will occur. The detected oscillation amplitude of this oscillation will become larger and larger as the value of the swept kicking frequency approaches closer and closer to the frequency Fdes. The second phase 102 of the start-up process terminates when the start-up controller circuit determines that detected amplitude of the mechanical oscillation at the currently selected kicking frequency is larger than a preset threshold amplitude, indicating that a large mechanical oscillation has started, and the frequency of that mechanical oscillation is close to (or perhaps equal to) the frequency Fdes.

In the third phase 106 of start-up (frequency tracking phase), the start-up controller circuit uses the frequency control signal 150 to set the kicking frequency to the same value as the measured frequency Fd_m for the oscillation at the end of the second phase, with the phase of kicking signal being $\phi d\_m+90°$, so that a mechanical-electrical positive-feedback is formed. The mode control signal 152 converts to operation in frequency tracking mode. In response to the sensed frequency of the mechanical oscillation provided by the measurement frequency signal 136, the DDS circuit generates the digital sinusoid signal 142 with a drive frequency Fdr that is the same as the measurement frequency Fd_m, which is close to or equal to the frequency Fdes of the desired resonant mode. It is important to note that the key here is for the frequency Fdr to be close enough to the frequency Fdes that the desired oscillation amplitude can be achieved and maintained over time. In response to the mode control signal 152 output by the start-up controller circuit, the AGC circuit applies the fixed amplitude and fixed DC offset to the digital sinusoid signal 142 which is necessary for maintaining a constant drive force through the drive signal Ds. The generated digital sinusoid signal 146 is converted by the digital-to-analog converter (DAC) circuit to produce the differential oscillating drive signal Ds for application to the driving capacitors 20. At this point, the MEMS microstructure 12 is mechanically oscillating in a sustained self-oscillation mode at or near the frequency Fdes of the desired resonant mode, and the displacement amplitude of the driving mass 14 will increase in an exponential manner. The start-up controller circuit monitors the increase in the amplitude Amp of the mechanical oscillation of the driving mass 14 as indicated by the oscillation amplitude signal 130, and the third phase 106 terminates when sensed oscillation amplitude reaches the threshold amplitude B. The purpose of the frequency tracking operation in this phase of start-up is to maintain the positive feedback with a constant driving force, so that mechanical oscillation is maintained at or near the frequency Fdes with an amplitude that grows exponentially.

In the fourth phase 108 (frequency tracking and automatic gain control), operation in frequency tracking mode continues to drive with a drive frequency Fdr at the measured frequency Fd_m that is close to or equal to the frequency Fdes. The mode control signal 152 output by the start-up controller circuit, however, changes to enable control of the drive force applied in respect to the drive signal Ds. The amplitude Amp of the mechanical oscillation of the driving mass 14 is monitored by the start-up controller circuit through the oscillation amplitude signal 130, and the AGC circuit adjusts either the DC level or the AC amplitude of the digital sinusoid signal 142 at the measured frequency Fd_m so as to maintain the mechanical oscillation at or near the frequency Fdes and achieve a desired amplitude A. The start-up controller circuit monitors the amplitude Amp of the mechanical oscillation of the driving mass 14 as indicated by the oscillation amplitude signal 130, and operation in the fourth phase 108 will continue so as to maintain mechanical oscillation at or near the frequency Fdes and with a regulated amplitude A.

While the invention has been illustrated and described in detail in the drawings and foregoing description, such illustration and description are considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

What is claimed is:

1. A method for start-up of a microelectromechanical system (MEMS) gyroscope having a plurality of intrinsic resonant modes, comprising:
    applying a drive signal to the MEMS gyroscope; and
    sensing frequency and amplitude of mechanical oscillation of the MEMS gyroscope in response to the applied drive signal;
    wherein start-up includes the following steps performed in the recited order:
        setting a frequency for the applied drive signal to a plurality of kicking frequencies that are frequency offset from a resonant frequency corresponding to a desired one of the plurality of intrinsic resonant modes;
        determining that the amplitude of the sensed mechanical oscillation in response to a certain one of the plurality of kicking frequencies exceeds a first amplitude threshold;
        controlling a drive frequency for the applied drive signal using a frequency tracking process so as to sustain mechanical oscillation at the sensed frequency of mechanical oscillation for said certain one of the plurality of kicking frequencies;
        sensing an increase in the amplitude of the sensed mechanical oscillation that exceeds a second amplitude threshold; and
        gain controlling the applied drive signal so that the sensed amplitude of the mechanical oscillation matches a third amplitude threshold greater than the second amplitude threshold.

2. The method of claim 1, further comprising, in addition to gain controlling, simultaneously controlling the drive frequency for the applied drive signal using the frequency tracking process so as to sustain mechanical oscillation at the sensed frequency.

3. The method of claim 1, further comprising, prior to setting the frequency for the applied drive signal, allowing a period of time for residual mechanical oscillation of the MEMS gyroscope to quiet down.

4. The method of claim 3, wherein allowing the period of time further includes inhibiting application of a force to the MEMS gyroscope through the applied drive signal during said period of time.

5. The method of claim 3, wherein allowing the period of time further includes inhibiting application of a force to the MEMS gyroscope through the applied drive signal during said period of time.

6. The method of claim 1, wherein setting the frequency for the applied drive signal to the plurality of kicking frequencies comprises: performing a sweep of the kicking frequency over a range of said plurality of kicking frequencies that are frequency offset from the resonant frequency.

7. The method of claim 6, wherein performing the sweep comprises progressively changing the kicking frequency for the applied drive signal in frequency steps to approach the resonant frequency corresponding to the desired one of the plurality of intrinsic resonant modes.

8. The method of claim 1, wherein the frequency offset is higher than the resonant frequency corresponding to the desired one of the plurality of intrinsic resonant modes.

9. The method of claim 1, wherein the frequency offset is lower than the resonant frequency corresponding to the desired one of the plurality of intrinsic resonant modes.

10. The method of claim 1, wherein the third amplitude threshold is less than an amplitude at which a duffing effect is present with respect to mechanical oscillation at the resonant frequency corresponding to the desired one of the plurality of intrinsic resonant modes.

11. A method for start-up of a resonant mechanical system having an intrinsic resonant mode, comprising:
   applying a drive signal which induces oscillation of the resonant mechanical system; and
   sensing frequency and amplitude of mechanical oscillation in response to the applied drive signal;
   wherein start-up includes the following steps performed in the recited order:
      sweeping a frequency for the applied drive signal over a range of kicking frequencies that are frequency offset from a resonant frequency of said intrinsic resonant mode;
      identifying one of kicking frequencies of said range as corresponding to the resonant frequency if the amplitude of the sensed mechanical oscillation exceeds a first amplitude threshold;
      controlling a drive frequency for the applied drive signal using a frequency tracking process so as to sustain mechanical oscillation at the sensed frequency of the mechanical oscillation for said identified one of the kicking frequencies;
      sensing an increase in the amplitude of the sensed mechanical oscillation that exceeds a second amplitude threshold; and
      gain controlling the applied drive signal so that the sensed amplitude of the mechanical oscillation matches a third amplitude threshold greater than the second amplitude threshold.

12. The method of claim 11, further comprising, in addition to gain controlling, simultaneously controlling the drive frequency for the applied drive signal using the frequency tracking process so as to sustain mechanical oscillation at the sensed frequency.

13. The method of claim 12, further comprising, prior to sweeping the frequency, allowing a period of time for residual mechanical oscillation of the resonant mechanical system to quiet down.

14. The method of claim 13, wherein allowing the period of time further includes inhibiting application of a force to the resonant mechanical system through the applied drive signal during said period of time.

15. The method of claim 11, wherein the frequency offset is higher than the resonant frequency.

16. The method of claim 11, wherein the frequency offset is lower than the resonant frequency.

17. The method of claim 11, wherein sweeping comprises progressively changing the kicking frequency for the applied drive signal in frequency steps to approach the resonant frequency.

18. The method of claim 11, wherein the third amplitude threshold is less than an amplitude at which a duffing effect is present with respect to mechanical oscillation at the resonant frequency.

19. The method of claim 11, wherein the resonant mechanical system is a microelectromechanical system (MEMS) gyroscope.

20. A method for start-up of a resonant mechanical system having an intrinsic resonant mode, comprising:
   applying a drive signal which induces oscillation of the resonant mechanical system; and
   sensing frequency and amplitude of mechanical oscillation in response to the applied drive signal;
   wherein start-up includes the following steps performed in the recited order:
      sweeping a frequency for the applied drive signal over a range of kicking frequencies that are near a resonant frequency of said intrinsic resonant mode;
      identifying one of kicking frequencies of said range as corresponding to the resonant frequency if the amplitude of the sensed mechanical oscillation exceeds a first amplitude threshold;
      controlling a drive frequency for the applied drive signal using a frequency tracking process so as to sustain mechanical oscillation at the sensed frequency of the mechanical oscillation for said identified one of the kicking frequencies;
      sensing an increase in the amplitude of the sensed mechanical oscillation that exceeds a second amplitude threshold; and
      gain controlling the applied drive signal so that the sensed amplitude of the mechanical oscillation matches a third amplitude threshold greater than the second amplitude threshold;
   wherein the third amplitude threshold is less than an amplitude at which a duffing effect is present with respect to mechanical oscillation at the resonant frequency.

21. The method of claim 20, further comprising, in addition to gain controlling, simultaneously controlling the drive frequency for the applied drive signal using the frequency tracking process so as to sustain mechanical oscillation at the sensed frequency.

22. The method of claim 21, further comprising, prior to sweeping the frequency, allowing a period of time for residual mechanical oscillation of the resonant mechanical system to quiet down.

23. The method of claim 22, wherein allowing the period of time further includes inhibiting application of a force to the resonant mechanical system through the applied drive signal during said period of time.

24. The method of claim 20, wherein the range of frequencies is frequency offset from the resonant frequency.

25. The method of claim 24, wherein the frequency offset is higher than the resonant frequency.

26. The method of claim 24, wherein the frequency offset is lower than the resonant frequency.

27. The method of claim 20, wherein sweeping comprises progressively changing the kicking frequency for the applied drive signal in frequency steps to approach the resonant frequency.

28. The method of claim 20, wherein the resonant mechanical system is a microelectromechanical system (MEMS) gyroscope.

29. A method for start-up of a microelectromechanical system (MEMS) gyroscope having a plurality of intrinsic resonant modes, comprising:
applying a drive signal to the MEMS gyroscope; and
sensing frequency and amplitude of mechanical oscillation of the MEMS gyroscope in response to the applied drive signal;
wherein start-up includes the following steps performed in the recited order:
setting a frequency for the applied drive signal to a kicking frequency that is frequency offset from a resonant frequency corresponding to a desired one of the plurality of intrinsic resonant modes;
determining that the amplitude of the sensed mechanical oscillation in response to the kicking frequency exceeds a first amplitude threshold;
controlling a drive frequency for the applied drive signal using a frequency tracking process so as to sustain mechanical oscillation at the sensed frequency of the mechanical oscillation for said kicking frequency;
sensing an increase in the amplitude of the sensed mechanical oscillation that exceeds a second amplitude threshold; and
gain controlling the applied drive signal so that the sensed amplitude of the mechanical oscillation matches a third amplitude threshold greater than the second amplitude threshold;
wherein the third amplitude threshold is less than an amplitude at which a duffing effect is present with respect to mechanical oscillation at the resonant frequency corresponding to the desired one of the plurality of intrinsic resonant modes.

30. The method of claim 29, further comprising, in addition to gain controlling, simultaneously controlling the drive frequency for the applied drive signal using the frequency tracking process so as to sustain mechanical oscillation at the sensed frequency.

31. The method of claim 29, further comprising, prior to setting the frequency for the applied drive signal, allowing a period of time for residual mechanical oscillation of the MEMS gyroscope to quiet down.

32. The method of claim 31, wherein allowing the period of time further includes inhibiting application of a force to the MEMS gyroscope through the applied drive signal during said period of time.

33. The method of claim 29, wherein setting the frequency for the applied drive signal to the kicking frequency comprises: performing a sweep of the kicking frequency over a range of frequencies that are frequency offset from the resonant frequency corresponding to the desired one of the plurality of intrinsic resonant modes.

34. The method of claim 33, wherein the frequency offset is higher than the resonant frequency corresponding to the desired one of the plurality of intrinsic resonant modes.

35. The method of claim 33, wherein the frequency offset is lower than the resonant frequency corresponding to the desired one of the plurality of intrinsic resonant modes.

36. The method of claim 33, wherein performing the sweep comprises progressively changing the kicking frequency for the applied drive signal in frequency steps to approach the resonant frequency corresponding to the desired one of the plurality of intrinsic resonant modes.

37. A method for start-up of a microelectromechanical system (MEMS) gyroscope having a plurality of intrinsic resonant modes, comprising:
applying a drive signal to the MEMS gyroscope; and
sensing frequency and amplitude of mechanical oscillation of the MEMS gyroscope in response to the applied drive signal;
wherein start-up includes the following steps performed in the recited order:
setting a frequency for the applied drive signal to a kicking frequency that is frequency offset from a resonant frequency corresponding to a desired one of the plurality of intrinsic resonant modes, wherein setting the frequency for the applied drive signal to the kicking frequency comprises:
performing a sweep of the kicking frequency over a range of frequencies that are frequency offset from the resonant frequency corresponding to the desired one of the plurality of intrinsic resonant modes;
determining that the amplitude of the sensed mechanical oscillation in response to the kicking frequency exceeds a first amplitude threshold;
controlling a drive frequency for the applied drive signal using a frequency tracking process so as to sustain mechanical oscillation at the sensed frequency of the mechanical oscillation for said kicking frequency;
sensing an increase in the amplitude of the sensed mechanical oscillation that exceeds a second amplitude threshold; and
gain controlling the applied drive signal so that the sensed amplitude of the mechanical oscillation matches a third amplitude threshold greater than the second amplitude threshold.

38. The method of claim 37, further comprising, in addition to gain controlling, simultaneously controlling the drive frequency for the applied drive signal using the frequency tracking process so as to sustain mechanical oscillation at the sensed frequency.

39. The method of claim 37, further comprising, prior to setting the frequency for the applied drive signal, allowing a period of time for residual mechanical oscillation of the MEMS gyroscope to quiet down.

40. The method of claim 37, wherein the frequency offset is higher than the resonant frequency corresponding to the desired one of the plurality of intrinsic resonant modes.

41. The method of claim 37, wherein the frequency offset is lower than the resonant frequency corresponding to the desired one of the plurality of intrinsic resonant modes.

42. The method of claim 37, wherein performing the sweep comprises progressively changing the kicking frequency for the applied drive signal in frequency steps to approach the resonant frequency corresponding to the desired one of the plurality of intrinsic resonant modes.

43. The method of claim 37, wherein the third amplitude threshold is less than an amplitude at which a duffing effect is present with respect to mechanical oscillation at the resonant frequency corresponding to the desired one of the plurality of intrinsic resonant modes.

* * * * *